(12) United States Patent
Frias

(10) Patent No.: US 7,810,786 B2
(45) Date of Patent: Oct. 12, 2010

(54) GATE VALVE ACTUATOR

(75) Inventor: Luis Ontiveros Frias, Tijuana (MX)

(73) Assignee: Valterra Products, Inc., Mission Hills, CA (US)

( * ) Notice: Subject to any disclaimer, the term of this patent is extended or adjusted under 35 U.S.C. 154(b) by 334 days.

(21) Appl. No.: 11/975,268

(22) Filed: Oct. 19, 2007

(65) Prior Publication Data

US 2009/0101856 A1    Apr. 23, 2009

(51) Int. Cl.
*F16K 31/00* (2006.01)
(52) U.S. Cl. .................. 251/291; 251/129.01; 251/326; 251/129.03; 137/899
(58) Field of Classification Search ............ 251/129.01, 251/147, 326, 294, 291, 129.03; 137/899; 74/625, 89.17, 422, 89.19
See application file for complete search history.

(56) References Cited

U.S. PATENT DOCUMENTS

| | | | | |
|---|---|---|---|---|
| 2,641,370 A | * | 6/1953 | Pherson | 414/547 |
| 3,941,349 A | * | 3/1976 | Pierson | 251/100 |
| 4,320,816 A | * | 3/1982 | Callahan et al. | 182/55 |
| 4,624,280 A | * | 11/1986 | DePirro | 137/392 |
| 4,693,447 A | * | 9/1987 | Perez | 251/129.12 |
| 4,875,504 A | * | 10/1989 | Nicholson | 137/899 |
| 5,056,544 A | * | 10/1991 | Stevens | 134/166 R |
| 5,078,180 A | * | 1/1992 | Collins | 137/899 |
| 6,098,956 A | * | 8/2000 | Sprague, II | 251/129.11 |
| 6,408,886 B1 | * | 6/2002 | Milano et al. | 137/899 |
| 7,600,739 B2 | * | 10/2009 | Phillips et al. | 251/266 |

* cited by examiner

*Primary Examiner*—John K Fristoe, Jr.
*Assistant Examiner*—Marina Tietjen
(74) *Attorney, Agent, or Firm*—Beaumont Gitlin Tash-Jian; Larry F. Gitlin, Esq

(57) ABSTRACT

In combination with an external actuator for electrically operating a gate valve for use with a recreational vehicle, a gate valve within a housing, a flow passageway, a valve closure member moveable transversely of the flow passageway to cause the passageway to open and close. The valve closure member comprises a valve stem and a connected handle. Also provided is an electrical control unit with a motor, an electrical drive means and a drive shaft to engage the handle. A switch means electrically connected to the control unit has an on and off position. In the on position, the actuator lifts the handle to move the gate and open the flow passageway. In the off position, the actuator retracts the handle to move the gate linearly to close the flow passageway. Also provided is a releasable ring pin which confines the handle and which, when removed, enables the manual override of the external actuator.

3 Claims, 9 Drawing Sheets

GATE VALVE ACTUATOR

BACKGROUND OF THE INVENTION

1. Field of the Invention

This invention relates generally to the field of gate valves and more particularly to a device that is employed in conjunction with recreational vehicles and the like to enhance and improve the operation and effectiveness of the actuator used to control the movement of the gate inside the valve opening to regulate and control waste disposal.

2. Description of the Prior Art

Gate valves have a variety of applications, including their use in conjunction with recreational vehicle holding tanks that contain solid and liquid waste materials. Manual or electrically operated gate valves include a valve body in which a gate is actuated by a wire cable connected to a valve stem extending from the gate. The cable is generally attached to a handle, which can be manipulated manually or electrically forwards or backwards (or up or down) to move the gate in and out of the valve opening. In situations where the holding tank is mounted under the body of the vehicle and the valve employs a handle actuated cable with a short throw, it is relatively easy to operate the gate valve to open and close it. The unfortunate drawback requires the person to get low to the ground beneath the vehicle, possibly even on one's hands and knees or back, to maneuver in close enough to the handle to properly operate the valve.

Placing a high value on convenience in these situations, valves of the sort being discussed here are now more likely to be operated from a remote location, usually mounted somewhere on the exterior surface of the vehicle on a control panel together, for example, with the water and electrical connections. The drawback, however, regards the problem in employing a cable to effectively remotely operate the valve when the cable and handle are not substantially in some sort of linear alignment with the valve stem and valve gate. What usually results, in this instance, is the difficulty in smoothly and efficiently communicating a physical force to the cable to enable it to immediately and effectively open and close the valve. Under less than ideal circumstances, the cable can become stuck simply because it lacks the necessary axial forces required to push and pull the gate sufficiently to open and close it. Because the portion of the cable nearest to the valve stem typically has no substantial support or rigidity, the cable section located between the stem and the handle also tends to become slack and weakened and, thus, ineffective as a closure device. Usually, this results in a disruption of the axial forces that would otherwise be produced through the cable and communicated immediately to the gate upon activation at the handle end.

Still, even the operation of the cable actuator from a remote location has its drawbacks. The use of a cable apparatus invites problems that are not likely to arise in the absence of the use of a cable component. For example, exposed cable beneath the vehicle is at risk of some degree of physical damage if struck by a hard object, like a loose rock caroming off the road surface while the vehicle is in motion. Another possibility arises when someone or something unwittingly grabs or engages the cable and yanks or pulls it from position, disengaging it from the gate valve or impeding its effectiveness. These things can and do happen given the opportunity.

The improvement of the present invention provides the means to reliably and electronically operate a cable actuated gate valve from a remote location by ensuring the application of a constant force axially generated through the cable body to cause the gate to open and close efficiently. This is achieved by a remote electrical connection between the gate valve itself and an actuator control conveniently located near or adjacent to an accessible area in or on the vehicle. Rather than operating the valve gate manually from a remote location, the valve is operated electronically to ensure that the mechanical operation is constrained close to the valve itself. Thus, there are no exposed mechanical cables or wires that are likely to interfere with the operation.

Still, in the event something should go wrong with the electrical actuator, a device is provided that serves a dual purpose. The first is to secure the handle used to operate the plunger in place to ensure communication with the electrically activated device that provides the handle and, thus the plunger, with vertical movement. The second is to provide for the release of the connection between that device and the handle to allow the handle to be operated manually in case the electrical components should fail for some reason.

SUMMARY OF THE INVENTION

The device of the present invention provides, in combination with an external actuator for electrically operating a gate valve for use in association with a recreational vehicle, the gate valve having upper and lower housing members, a flow passageway through the lower housing member, a valve closure member moveable transversely of the flow passageway into the upper housing member to cause the flow passageway to open and into the lower housing member to cause the flow passageway to close. The valve closure member comprises a valve stem and a handle member attached to the valve stem. Also provided is an electrical control unit with a motor adapted to be attached to the housing, usually the upper gate valve housing member, an electrical drive means and a drive shaft with a means to engage the handle member connected thereto. A switch means, which is electrically connected to the electronic control unit, has an on position and an off position. In the on position, the actuator, employing the drive shaft, lifts the valve stem by the handle to cause the gate to move linearly to open the flow passageway. In the off position, the actuator, using the same drive shaft, retracts the valve stem by engaging the handle member, which causes the gate to move linearly to close the flow passageway. Also provided are lead wires to connect to a power source and a circuit breaker, and a ring pin releasably connected to the upper section of the drive shaft in direct engagement with the handle member to enable the manual override of the external actuator driven gate valve when removed.

Accordingly, an object of the present invention is to provide an external actuator for electrically operating a gate valve for use with a recreational vehicle or the like.

Another object of the present invention is to provide an external actuator for electrically operating a gate valve with a switching device for operating the valve from a remote location convenient for the operator.

Still another object of the present invention is to provide an external actuator for electrically operating a gate valve that does not include any manual cables deployed from the switch to the cable housing which, if interfered with by road debris or the cable is bent or becomes kinked, would undermine, if not eliminate, the actuator's ability to operate and/or be effective.

Still yet another object of the present invention is to provide an external actuator for electrically operating a gate valve with a releasable ring pin confining the handle of the gate plunger, which when removed, enables the manual override of the external electrical actuator that causes the linear up and down motion of the gate valve.

Still yet another object of the present invention is to provide an external actuator for electrically operating a gate valve that is easy and efficient to use.

Still yet another object of the present invention is to provide an external actuator for electrically operating a gate valve that is easy and cost effective to manufacture.

Other objects and advantages of the present invention will become apparent in the following specifications when considered in light of the attached drawings wherein a preferred embodiment of the invention is illustrated.

DETAILED DESCRIPTION OF THE INVENTION

Figure 1:
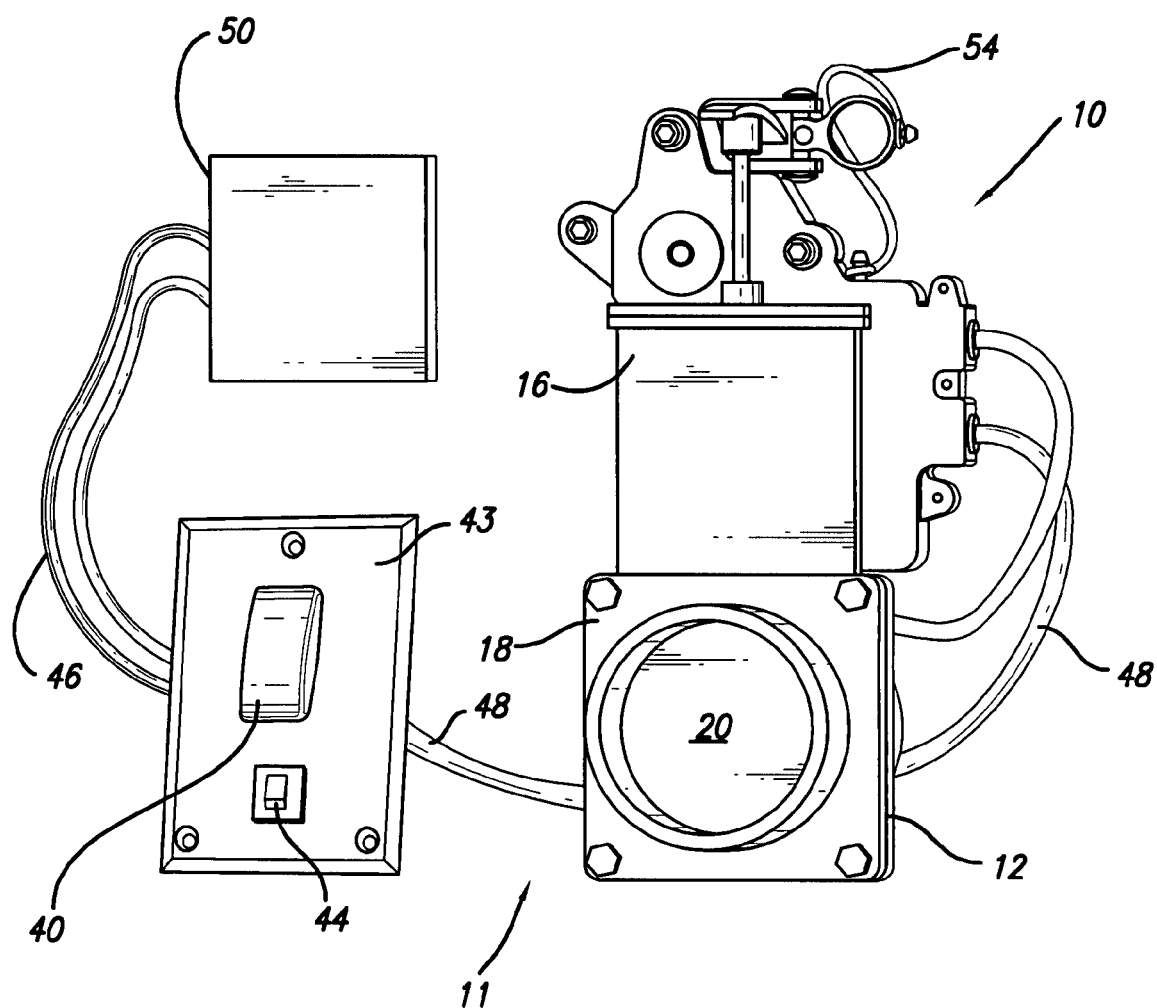
FIG. 1 is a front perspective view of the external actuator in combination with a gate valve in accordance with the present invention.
Figure 2:
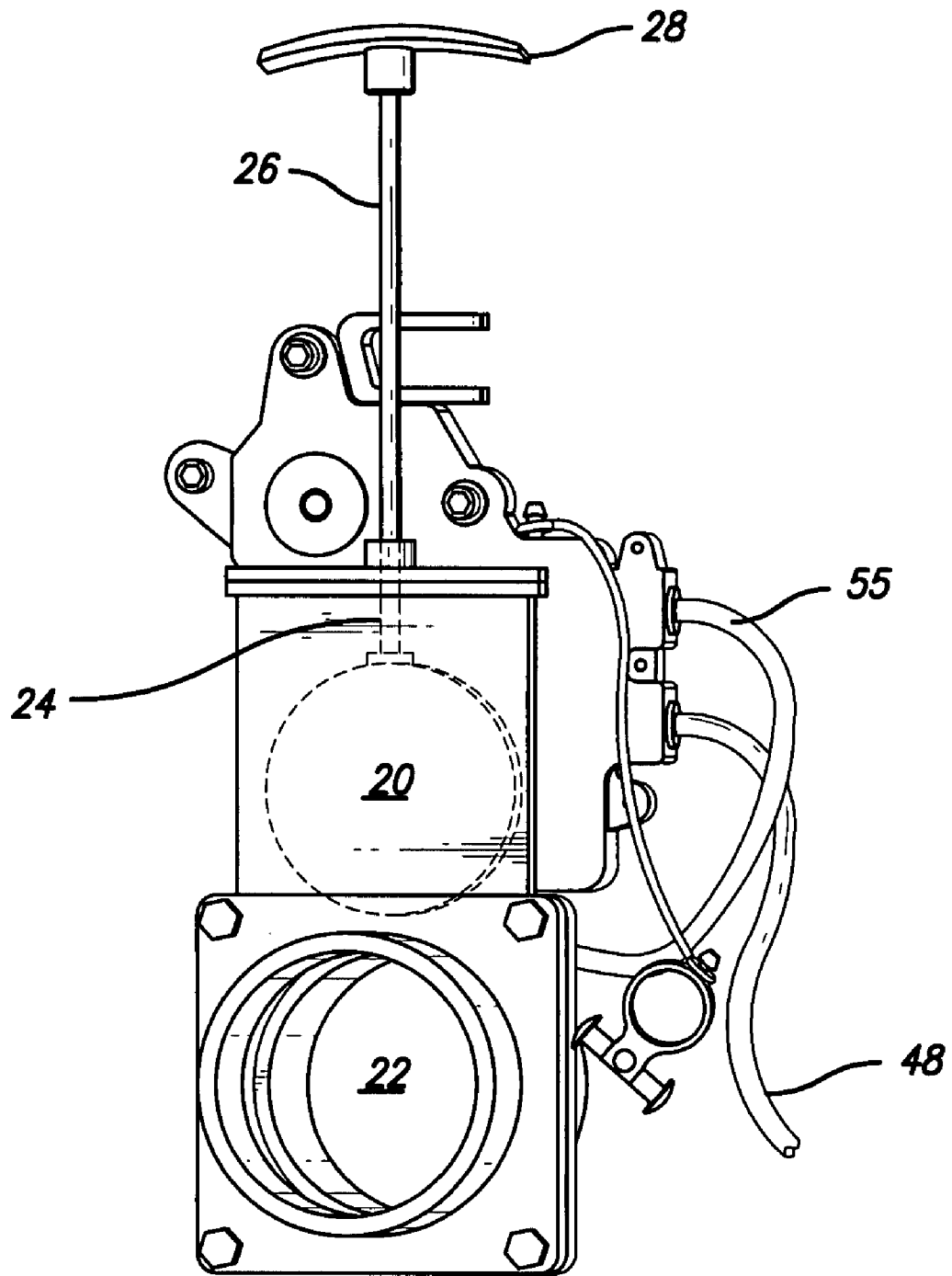
FIG. 2 is a perspective view of the external actuator (without the switch) in combination with a gate valve with the gate shown in the open position in accordance with the present invention.
Figure 3:
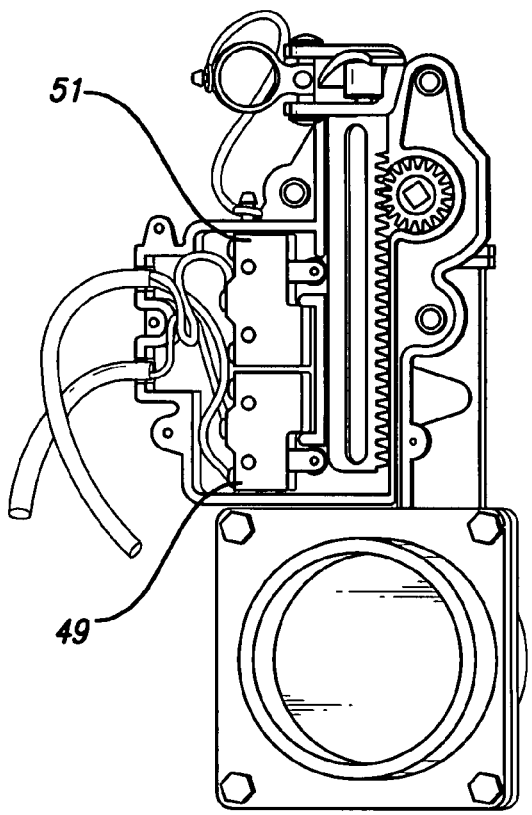
FIG. 3 is a perspective view of certain component elements of the interior drive mechanism of the external actuator with the gate shown in the closed position in accordance with the present invention.
Figure 4:
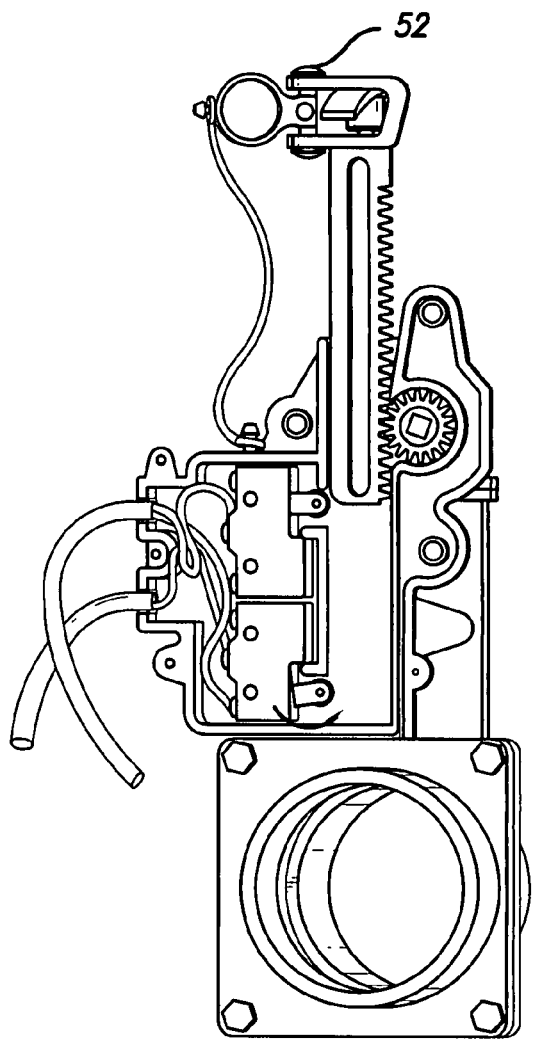
FIG. 4 is a perspective view of certain component elements of the interior drive mechanism of the external actuator with the gate shown in the opened position in accordance with the present invention.
Figure 5:
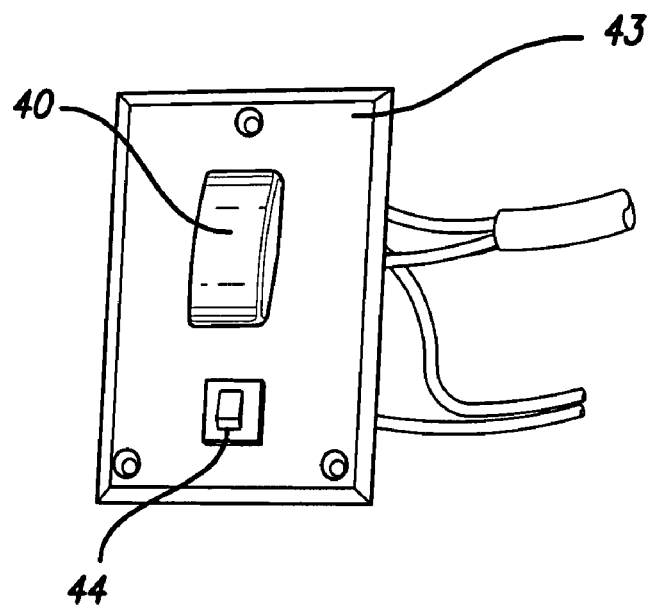
FIG. 5 is a view of the switch device shown with the electrical leads which connect to the motor and drive mechanism of the external actuator in accordance with the present invention.
Figure 6:
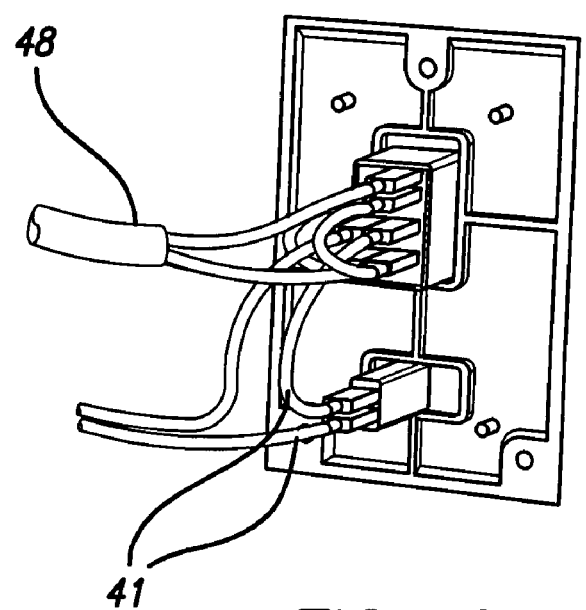
FIG. 6. Is a rear view of the switch device shown with the electrical leads which connect to the motor and drive mechanism of the external actuator in accordance with the present invention.
Figure 7:
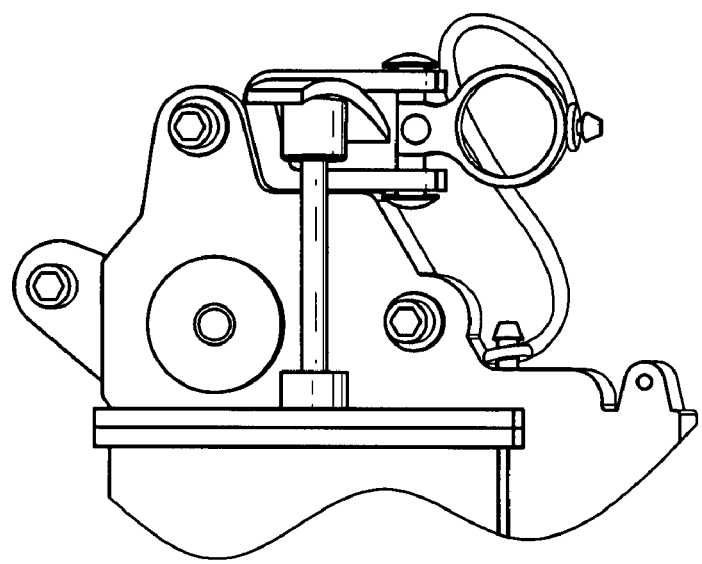
FIG. 7 is an enlarged view of the section of the external actuator where the ring pin is shown confining and securing the handle of the drive shaft in accordance with the present invention.
Figure 8:
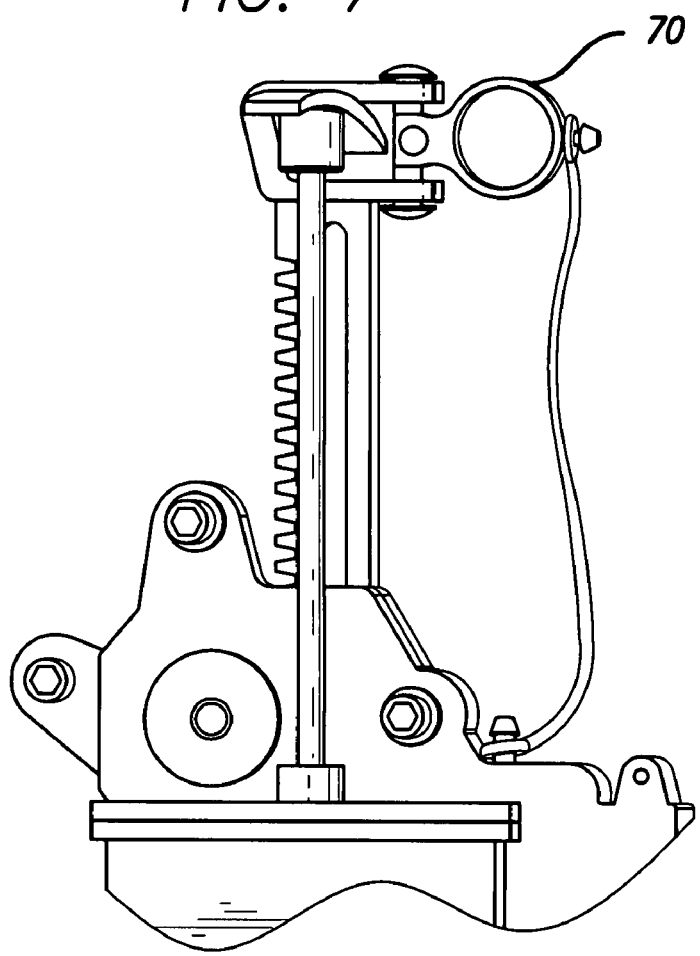
FIG. 8 is an enlarged view of the section of the external actuator with the ring pin shown confining and securing the handle of the vertically extended drive shaft in accordance with the present invention.

FIG. 1 illustrates the preferred embodiment of the device of the present invention, which is designated generally as 10. Device 10 comprises external actuator 11 for electrically operating gate valve 12 for use in association with recreational vehicle 14. The purpose of device 10 is to more efficiently and easily control the discharge of waste from a vehicle, typically recreational vehicle 14, into a sewer or septic tank (not shown). Device 10 specifically consists of gate valve 12, which includes upper housing member 16, lower housing member 18 and gate 20, which is caused to close and open flow passageway 22 to control the flow of waste. Attached to gate 20 is valve closure member 24, which moves transversely of flow passageway 22 into upper housing member 16 to cause flow passageway 22 to open and into lower passageway 18 to cause flow passageway 22 to close. Valve closure member 24 comprises valve lift arm 26 and handle 28 attached thereto. Connected to or incorporated into upper housing member 16 of gate valve 12 is control unit consisting of electric motor 32 and drive means 34, a drive shaft 36, which includes slotted u-shaped coupling member 38 to engage handle 28. Ring pin 52 attached to ring 70 engages slots 55 and 56 of u-shaped coupling member 38 to confine handle 28. Ring pin 52, when removed, enables the manual override of the electrical operation, as discussed in more detail below. Also provided are switch means 40 and circuit breaker switch 44, which are mounted on switch plate 43. Electric leads 41 extend from circuit breaker switch 44. Electrical leads 46 connect switch member 40 to power source 50, which generates the power to electric motor 32 when switch member 40 is in the "on" position. Electric leads 48 connect switch 40 to micro switches 49 and 51 which are mounted inside upper housing 16 of gate valve 12. Electric lead 55 connects micro switches 49 and 51 to electric motor 32. Specifically, lead 55 is connected to the component of electric motor 32, specifically stator 56 which, when charged with an electric current to produce a rotating magnetic field, causes rotor 57 to rotate. Attached to rotor 57 is shaft 59, which projects through opening 61 in sprocketed wheel 63. Sprocketed wheel 63, in turn, joins with sprocketed drive shaft 36 to cause shaft 36 to either move up or down to open or close flow passageway 22, respectively. In the "on" position, drive means 34 engages drive shaft 36 to move shaft 36 upwardly engaging handle 28 in the process to lift gate 20 to open flow passageway 22 and allow waste (not shown) to flow through. Conversely, in the "off" position, drive means 34 engages sprocketed drive shaft 36 and, by reversing the direction of rotation, pulls shaft 36 in a downwards direction, thus pushing gate 20 to close passageway 22 to prevent the flow of waste (not shown).

Figure 9:
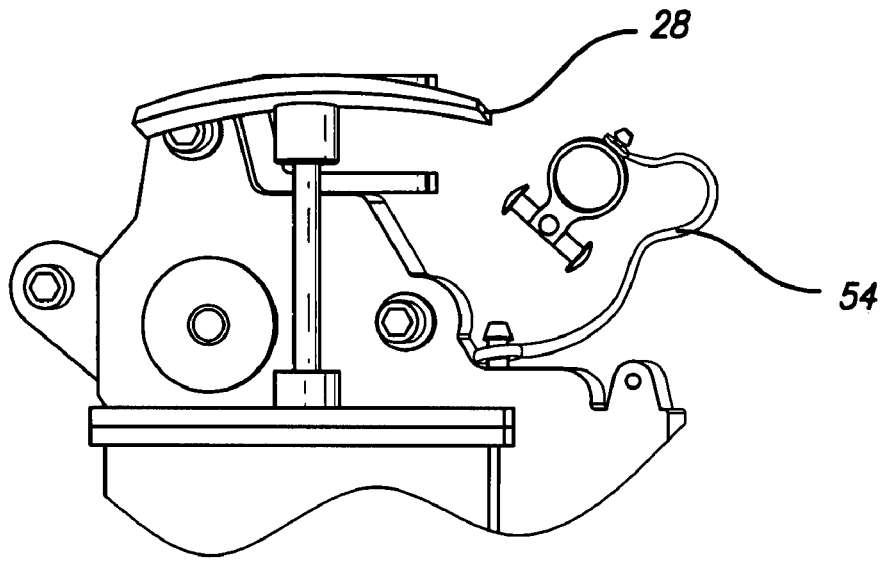
FIG. 9 is a perspective view of the ring pin shown disengaged from the drive shaft coupling to enable the manual override of the electronically operated external actuator in accordance with the present invention.
Figure 9A:
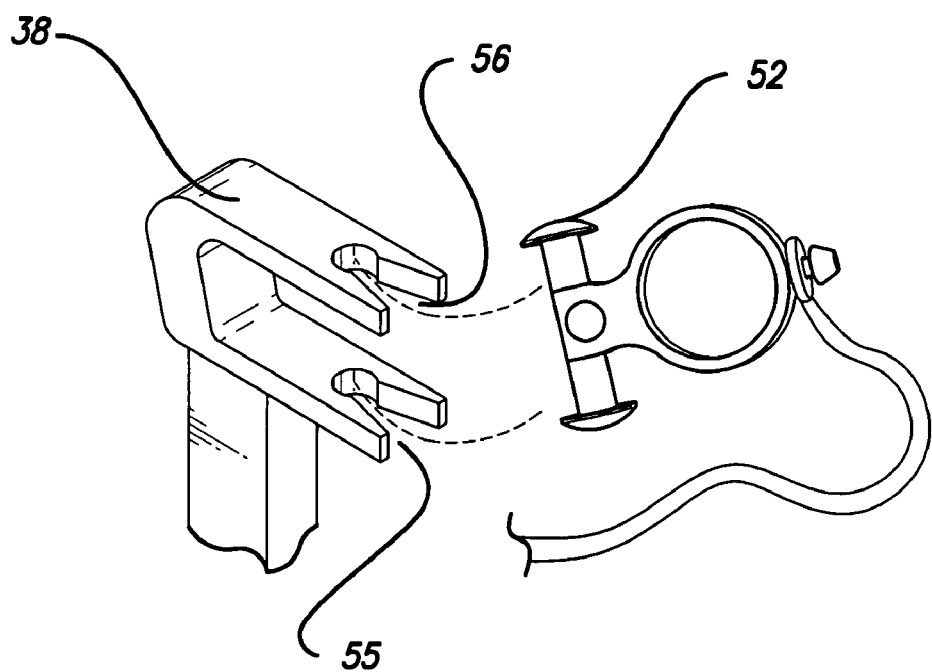
FIG. 9A is another perspective view of the ring pin shown disengaged from the drive shaft coupling to enable the manual override of the electronically operated external actuator in accordance with the present invention.
Figure 10:
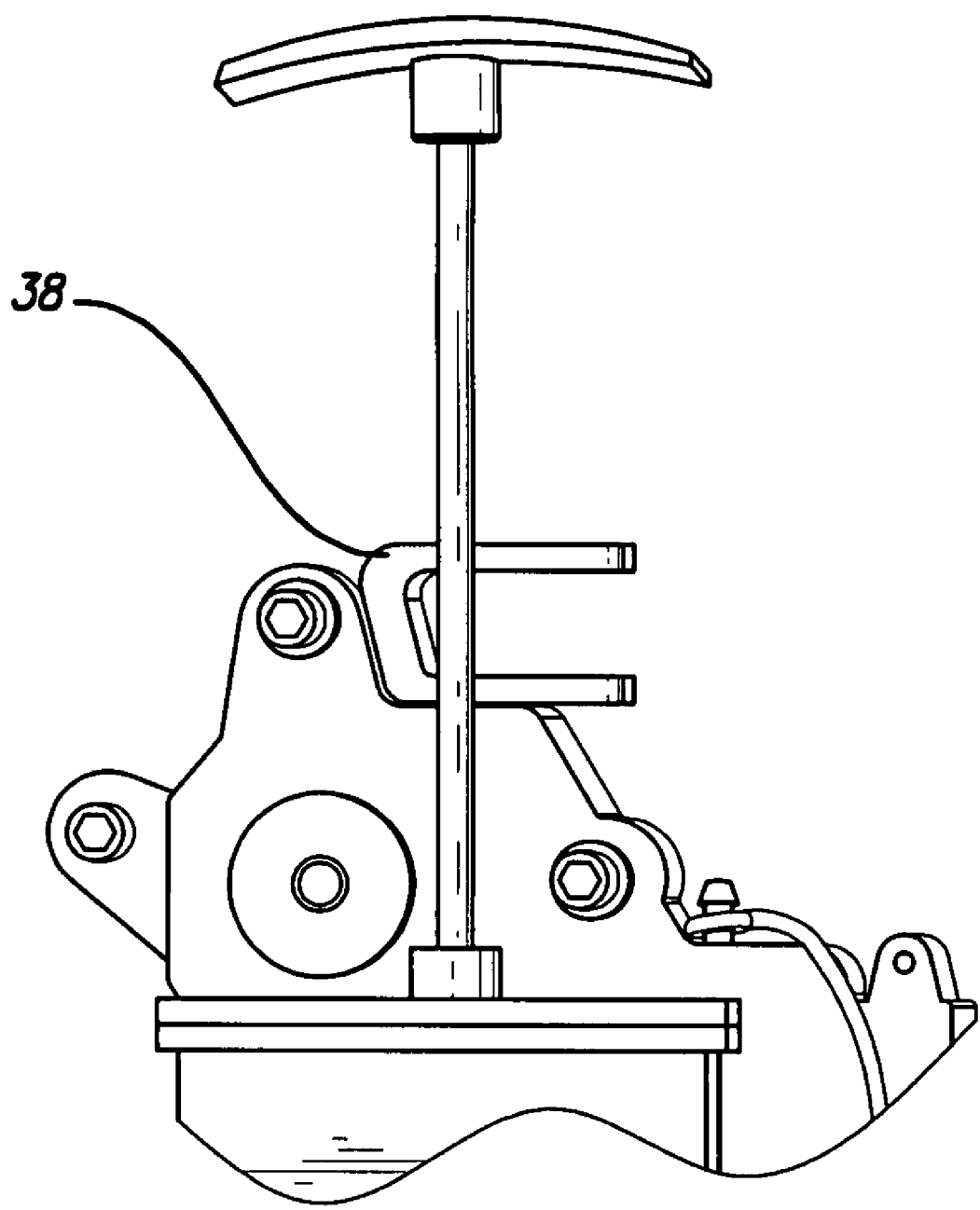
FIG. 10 is a view of the same region shown in FIG. 9 with the handle of the drive shaft manually extended in accordance with the present invention.
Figure 11:
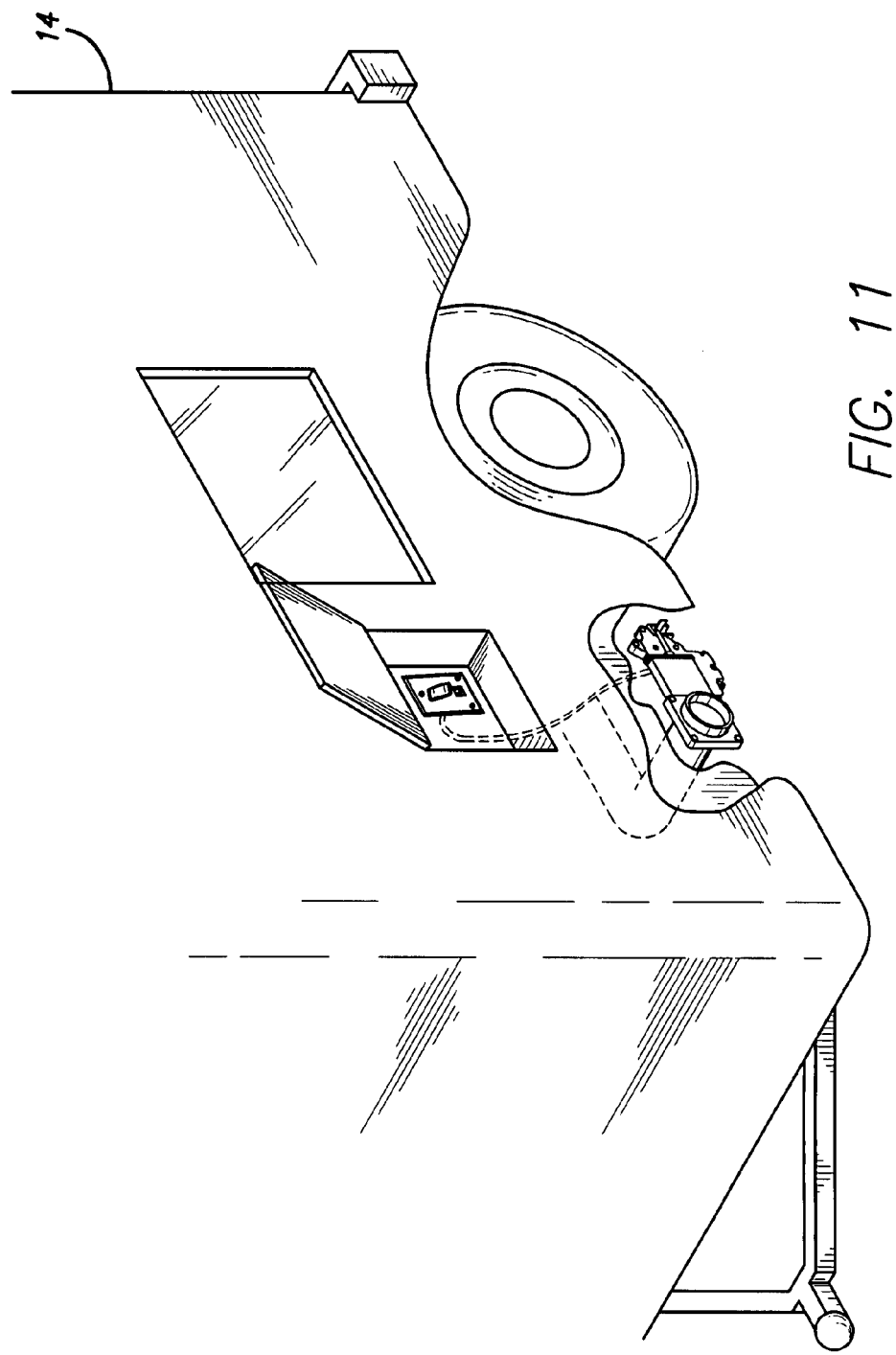
FIG. 11 is a perspective view of the external actuator in combination with a gate valve installed on a recreational vehicle in accordance with the present invention.
Figure 12:
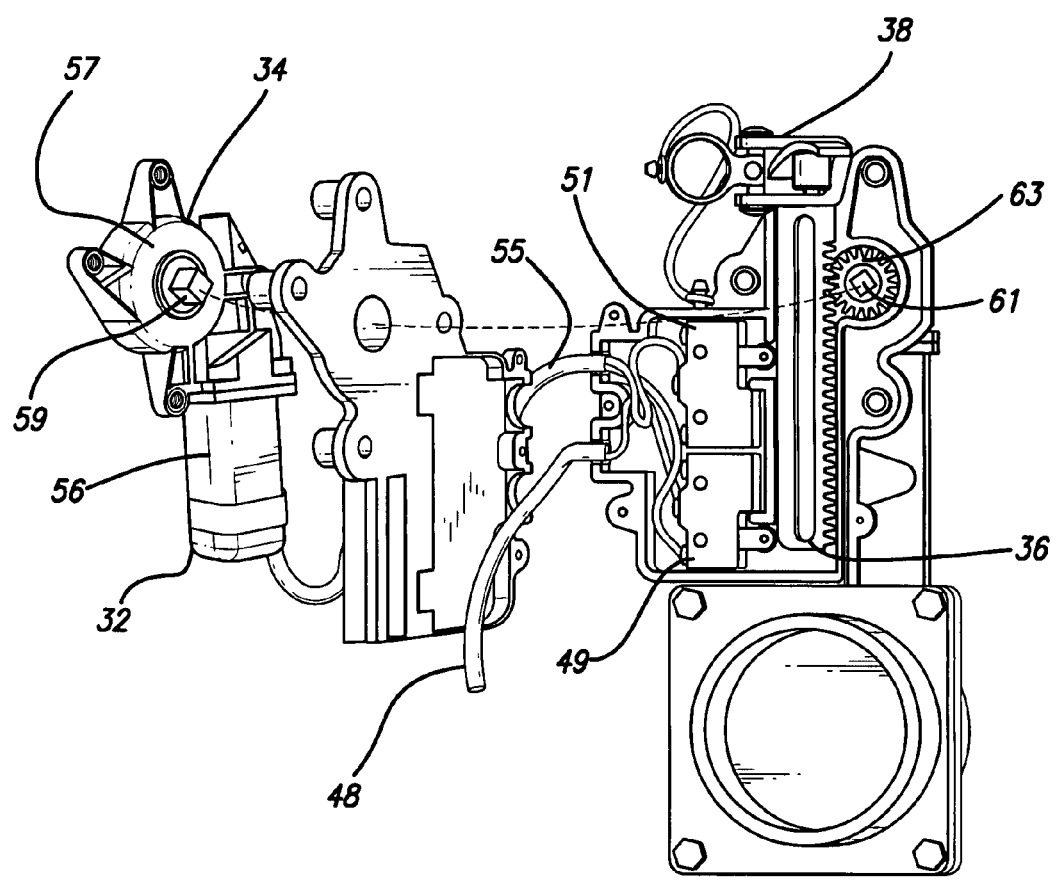
FIG. 12 is a perspective view of all the component elements of the interior drive mechanism of the external actuator in accordance with the present invention.

In order to use the manual override of the external electronically operated actuator, ring pin 52, which is attached to slotted unshaped coupling 38, is removed. Handle 28 is then rotated sufficiently, or at least approximately 90°, to enable it to clear lift arm 38, which may then be lifted or retracted manually to open and close gate 20, respectively (FIGS. 9, 9A and 10). Ring pin 52 is connected to external actuator 11 by tether 54.

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

The invention claimed is:

1. An external actuator for electrically or manually operating a gate valve for use in association with a recreational vehicle, said gate valve having upper and lower housing members, a flow passageway through said lower housing member, a valve closure member moveable transversely of said flow passageway into said upper housing member to cause said flow passageway to open and into said lower housing member to cause said flow passageway to close, said valve closure member having a connected valve stem and a handle member attached to said valve stem, the external actuator comprising:

an electronic control unit, said control unit adapted to be attached to said upper housing member and having a motor, an electrical drive means and a drive shaft with a u-shaped coupling member for engaging said handle member, said u-shaped coupling member having spaced-apart first and second arm members with said first arm member positioned above said second arm member and said handle member positioned in between said first and second arm members, each of said arm members having an end portion forming a slotted opening with spaced-apart clip arms and a retention clip;

a switch means electrically connected to said electronic control unit, said switch means having an on position and an off position, adapted in the on position to cause said drive shaft to lift said handle member upwardly and said valve closure member to move linearly in the same direction to open said flow passageway and in the off position to cause said handle member to move downwardly and said valve closure member to move linearly in the same direction to close said flow passageway;

a pair of lead wires connected to a power source; and a vertically disposed post member with retaining caps at each end for releasable engagement with said spaced-apart clip arms and said retention clips to enable said gate valve to be electromechanically actuated when said u-shaped coupling member engages said handle member or manually actuated when said handle member disengages from said u-shaped coupling member in rotatable motion.

2. The external actuator of claim 1 comprising a microswitch means to automatically stop the action of said motor after each complete on and off cycle.

3. The external actuator of claim 1 comprising a pull ring attached to said vertically disposed post member.

* * * * *